(12) United States Patent
Ver Hoven et al.

(10) Patent No.: US 7,384,014 B2
(45) Date of Patent: Jun. 10, 2008

(54) RETRACTOR WITH ALR MODE OF OPERATION WITH VEHICLE SENSOR BLOCK-OUT

(75) Inventors: Robert E. Ver Hoven, Harsens Island, MI (US); Richard A. Boelstler, Lake Orion, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 305 days.

(21) Appl. No.: 11/190,418

(22) Filed: Jul. 27, 2005

(65) Prior Publication Data
US 2006/0055226 A1    Mar. 16, 2006

Related U.S. Application Data

(60) Provisional application No. 60/609,745, filed on Sep. 14, 2004.

(51) Int. Cl.
*B65H 75/48* (2006.01)
(52) U.S. Cl. ............... 242/382.2; 280/806; 297/476
(58) Field of Classification Search .. 242/382.1–382.2, 242/383, 383.2, 384; 280/806; 297/476
See application file for complete search history.

(56) References Cited

U.S. PATENT DOCUMENTS

| | | | |
|---|---|---|---|
| 5,351,908 A | | 10/1994 | Umezawa et al. |
| 5,826,813 A | * | 10/1998 | Hibata ..................... 242/383.1 |
| 5,904,371 A | | 5/1999 | Koning et al. |
| 5,934,596 A | | 8/1999 | Gorman et al. |
| 5,938,138 A | * | 8/1999 | Sumiyashiki ............ 242/382.2 |
| 6,152,393 A | * | 11/2000 | Ando et al. ............... 242/382.2 |
| 6,631,865 B2 | * | 10/2003 | Palliser ..................... 242/382.2 |
| 6,641,076 B2 | * | 11/2003 | Mori et al. ............... 242/382.2 |
| 2003/0015616 A1 | * | 1/2003 | Palliser ..................... 242/382.2 |
| 2003/0132334 A1 | | 7/2003 | Koning et al. |

FOREIGN PATENT DOCUMENTS

| EP | 0 228 729 A | 7/1987 |
|---|---|---|
| EP | 0 811 535 A | 12/1997 |

* cited by examiner

*Primary Examiner*—Peter M. Cuomo
*Assistant Examiner*—Sang Kim
(74) *Attorney, Agent, or Firm*—Markell Seitzman (57) ABSTRACT

A belt retractor having ELR and ALR modes of operation is disclosed. The retractor comprises a sensor pawl movable between a released and a locked position with one or more teeth of a ratchet wheel rotatable with a spool of the retractor; the sensor pawl forming part of both ELR and ALR locking mechanisms. A spring biased first lever is rotatable to a first position and when in the first position urges the sensor pawl toward engagement with the ratchet wheel. The lever is movable to a second position, which permits the sensor pawl to move away from the ratchet wheel teeth thereby preventing the retractor from entering into its ALR mode of operation. The lever, when in its second position, biases the sensor pawl into engagement with a cooperating inertial mass that is part of a vehicle sensitive locking mechanism of the seat belt retractor. This bias force operative on the sensor pawl is effective to limit the motion of the inertial mass to lessen or eliminate vibrational movement of the inertial mass relative to the sensor pawl and movement relative to a support basket or support structure that holds the inertial mass thereby lessening acoustic and vibrational noise created by the movement and rattling of the sensor pawl and/or inertial mass.

18 Claims, 9 Drawing Sheets

RETRACTOR WITH ALR MODE OF OPERATION WITH VEHICLE SENSOR BLOCK-OUT

BACKGROUND AND SUMMARY OF THE INVENTION

This application claims the benefit of U.S. Provisional Application No. 60/609,745, filed on Sep. 14, 2004. The disclosure of the above application is incorporated herein by reference.

The present invention relates generally to safety restraint systems for motor vehicles. More specifically, the present invention is directed to an improved seat belt retractor having both ELR and ALR functionality.

As known in the art, ELR means an emergency locking retractor, which typically includes one or more inertial locking mechanisms, as more particularly illustrated in European Patent application EP0228729A1, which is incorporated herein by reference. The typical ELR seat belt retractor includes both a vehicle sensitive locking mechanism and a web sensitive locking mechanism. Often the vehicle sensitive locking mechanism and the web sensitive locking mechanism share common parts, which results in a more cost-effective seat belt retractor.

Quite often, the vehicle sensitive locking mechanism includes a first housing member that is rotationally mounted relative to a side of the retractor frame as well as to the retractor spool. This first housing member is called, in some literature, a lock cup. This first housing member supports a movable inertial mass configured as a ball or standing man. Sudden acceleration or acceleration in excess of a first limit value or severe rotation beyond a limit of the vehicle value causes movement of this inertial mass, which initiates lockup of the retractor. The first housing member typically includes a rotationally supported pawl, also referred to as a sensor pawl since it cooperates with the inertial mass. Movement of the inertial mass causes movement of the sensor pawl from a deactivated position to an activated position.

In the activated position the inertial pawl engages one or more teeth of a ratchet wheel; the ratchet wheel is loosely supported for rotation about the rotational axis of the spool and rotationally movable with the retractor spool. The engagement of the sensor pawl with the ratchet wheel links the ratchet wheel to the spool, which causes the lock cup member to rotate with the rotating spool. The rotation of the lock cup in concert with the rotation of the spool causes a lock pawl to move into engagement with the one or more teeth of another ratchet wheel (also referred to as a lock wheel). The lock wheel and the ratchet wheel that cooperates with the sensor pawl can be the same part. Engagement of the lock pawl with the teeth of the lock wheel leads to the initial lockup of a typical seat belt retractor.

When the seat belt tongue is removed from a cooperating seat belt buckle, the extended seat belt (also called seat belt webbing or webbing) will be retracted onto the spool in response to a bias force typically provided by a rewind spring of known construction. The rewind spring will rewind all of the available seat belt webbing onto the spool, so that the seat: belt retractor is ready for its next use cycle. This condition is typically called the stowed condition, as the seat belt webbing is now stowed or rewound onto spool. In this mode of operation it is anticipated and often required that the ELR locking mechanisms are in a deactivated condition so that the seat belt webbing is free to be extended (protracted) or retracted without intervention of the ELR locking mechanisms, that is the vehicle sensitive or web sensitive locking mechanisms. Occasionally, as reported in literature, as the seat belt webbing is moved to the stowed position, the vehicle sensitive locking mechanism inadvertently will assume an undesirable locked condition, which prevents the seat belt from being easily extended from the retractor. Fortunately this condition is usually temporary. This is an undesirable condition, which is avoided in the present invention by biasing the sensor pawl, when the seat belt is in a stowed condition, away from the ratchet wheel, preventing such an inadvertent lock condition of the retractor. Also, if the retractor is mounted in a movable seat back, this feature will prevent the retractor from locking up as the seat back is moved.

As mentioned, it is also commonplace for an emergency locking seat belt retractor to include ALR functionality. When in the ALR mode of operation, the vehicle sensitive and web sensitive locking functions are bypassed. As known by those skilled in the art, ALR functionality of the seat belt retractor is typically activated as the seat belt webbing is secured about a child seat. As also known by those skilled in the art, the acronym ALR stands for automatically locking retractor. In most situations, to activate the ALR mode of operation, most if not all of the seat belt webbing is manually pulled out or protracted from the spool prior to the seat belt being placed about a child seat. Then the seat belt is released to envelop the child seat. As the last section of seat belt webbing is protracted from the spool, the prior art retractor enters its automatic locking mode (ALR) mode of operation.

ALR mechanisms often include one or more gear devices, which rotate with the retractor spool and which provide an effective measurement of the length of webbing that has been removed from the spool. As the webbing is pulled from the spool, the ALR mechanism typically presents a mechanical feature, which causes the retractor to enter into its automatic locking mode of operation. For example, the one such ALR mechanism as shown in U.S. Pat. No. 5,904,371, which is incorporated herein by reference, selectively biases an ALR pawl into engagement with a ratchet wheel on extension of the last section of the seat belt. Biasing the ALR pawl into the ratchet wheel initiates retractor lockup as provided by the vehicle sensitive locking mechanism. The seat belt retractor will remain in its ALR mode of operation as the length of protracted webbing is rewound on the spool and will return the retractor to its ELR mode of operation upon full retraction of the belt.

The ALR mechanism in the above-referenced patent includes a spring-loaded lever that is physically maintained out of engagement with the ALR pawl. More specifically, the spring-loaded member is biased onto an edge of a cam disk that rotates with the spool. After a predetermined number of spool rotations corresponding to the removal of virtually all of the webbing from the spool, the cam disk is rotated into a position to present a notch to the spring-loaded lever. Thereafter the spring-loaded lever falls into the notch, engages a surface of the ALR lever and moves the ALR pawl into engagement with one of the teeth of the ratchet wheel to initiate lock-up of the retractor.

In the present invention a single lever, in cooperation with other components, is used to control the locking mode (ELR/ALR) of the seat belt retractor. When the seat belt is fully stowed on the retractor spool, the lever is moved to a position that biases a sensor pawl upon a vehicle inertia mass to effectively block out the ELR mode of operation. Upon protraction of a small yet determinable amount of webbing, the retractor enters into an ELR mode of operation. During its normal mode of use, such as with some of the seat belt webbing protracted about the occupant, the retractor will remain in the ELR mode of operation, however, the ALR mode of operation is not accessible until after all of the seat belt has been pulled from the retractor.

This extension of the seat belt occurs when the seat belt is being placed, for example, about a child seat. In the ELR mode of operation the lever is displaced from the sensor pawl, and the sensor pawl and the vehicle inertia mass are permitted to move in response to vehicle dynamic conditions. In the ALR mode of operation the lever biases the sensor pawl into a cooperating ratchet wheel. The change into the automatic locking mode (ALR) is effective not upon the protraction of the last section of seat belt webbing but upon the initial angular rotation of the spool, in the direction of retraction from the fully protracted condition. Entering into the ALR mode of operation at the beginning of seat belt retraction causes less strain on the sensor pawl than when initiating the ALR mode on the full extension of the webbing.

It is an object of the present invention to provide an improved seat belt retractor.

Accordingly the invention comprises: a seat belt retractor having ELR and ALR modes of operation. The retractor comprises a sensor pawl movable between a release and a locked position with one or more teeth of a ratchet wheel rotatable with a spool of the retractor; the sensor pawl forms part of both ELR and ALR locking mechanisms. A spring biased first lever is movable between various positions in which the sensor pawl is enabled or disabled to effect ELR block-out, ELR operation and ALR operation. The lever is rotatable to a first position and when in the first position urges the sensor pawl toward engagement with the ratchet wheel, permitting ALR operation. The lever is movable to a second position, which urges the sensor pawl away from the ratchet wheel teeth thereby preventing the retractor from entering into its ELR mode of operation. The lever, when in its second position, biases the sensor pawl into engagement with a cooperating inertial mass that is part of a vehicle sensitive locking mechanism of the seat belt retractor. This bias force (operative on the sensor pawl) is effective to limit the motion of the inertial mass to lessen or eliminate vibrational movement of the inertial mass relative to the sensor pawl (as well as movement of the sensor pawl) and movement relative to a support basket or support structure that,holds the inertial mass, thereby lessening acoustic and vibrational noise created by the movement and rattling of the sensor pawl and/or inertial mass. When the lever is in a mid-position the sensor pawl and vehicle mass are free to move and the retractor is in its ELR mode of operation.

Many other objects and purposes of the invention will be clear from the following detailed description of the drawings.

DETAILED DESCRIPTION OF THE DRAWINGS

Figure 1:
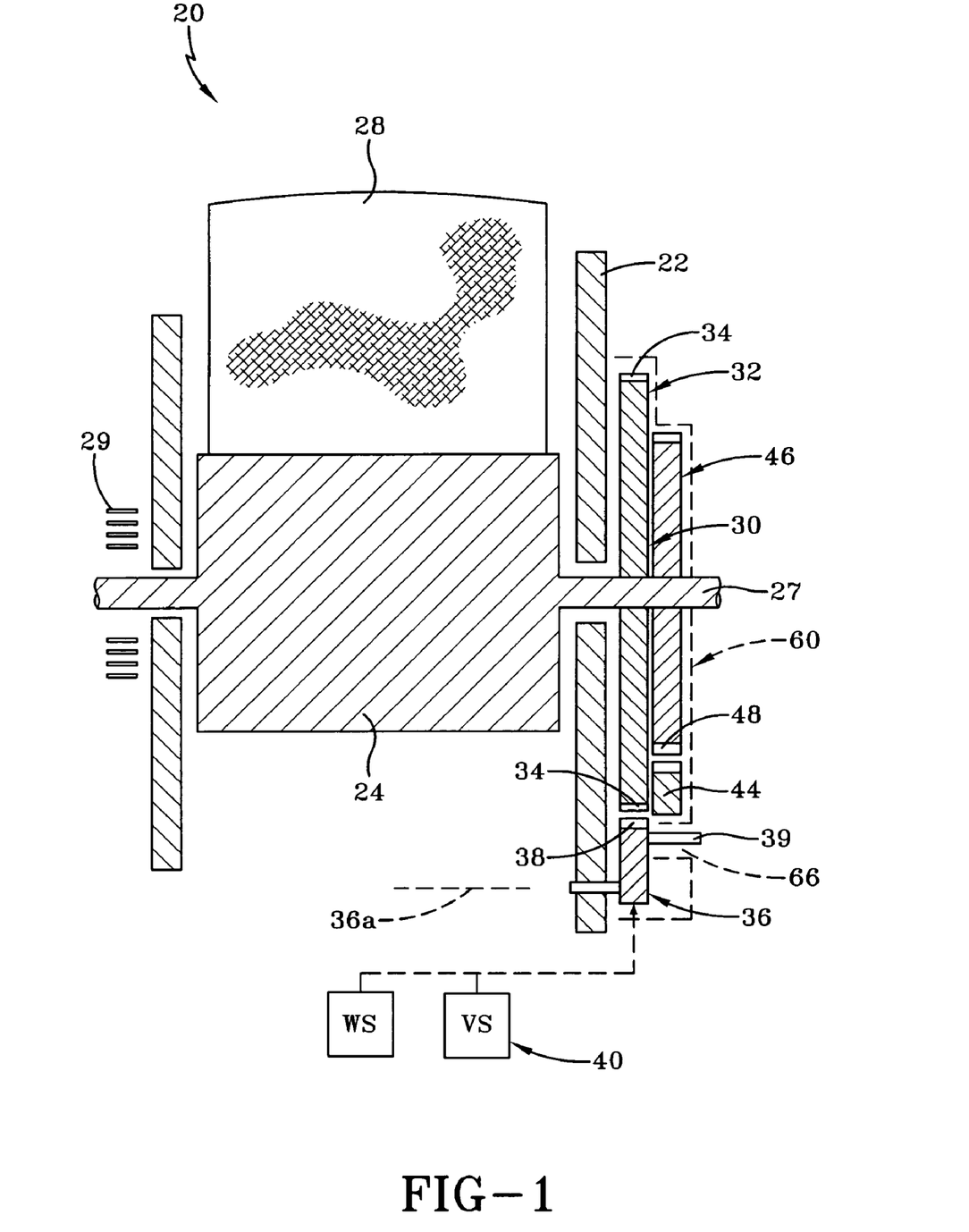
FIG. 1 diagrammatically shows a seat belt retractor incorporating the present invention.
Figure 2:
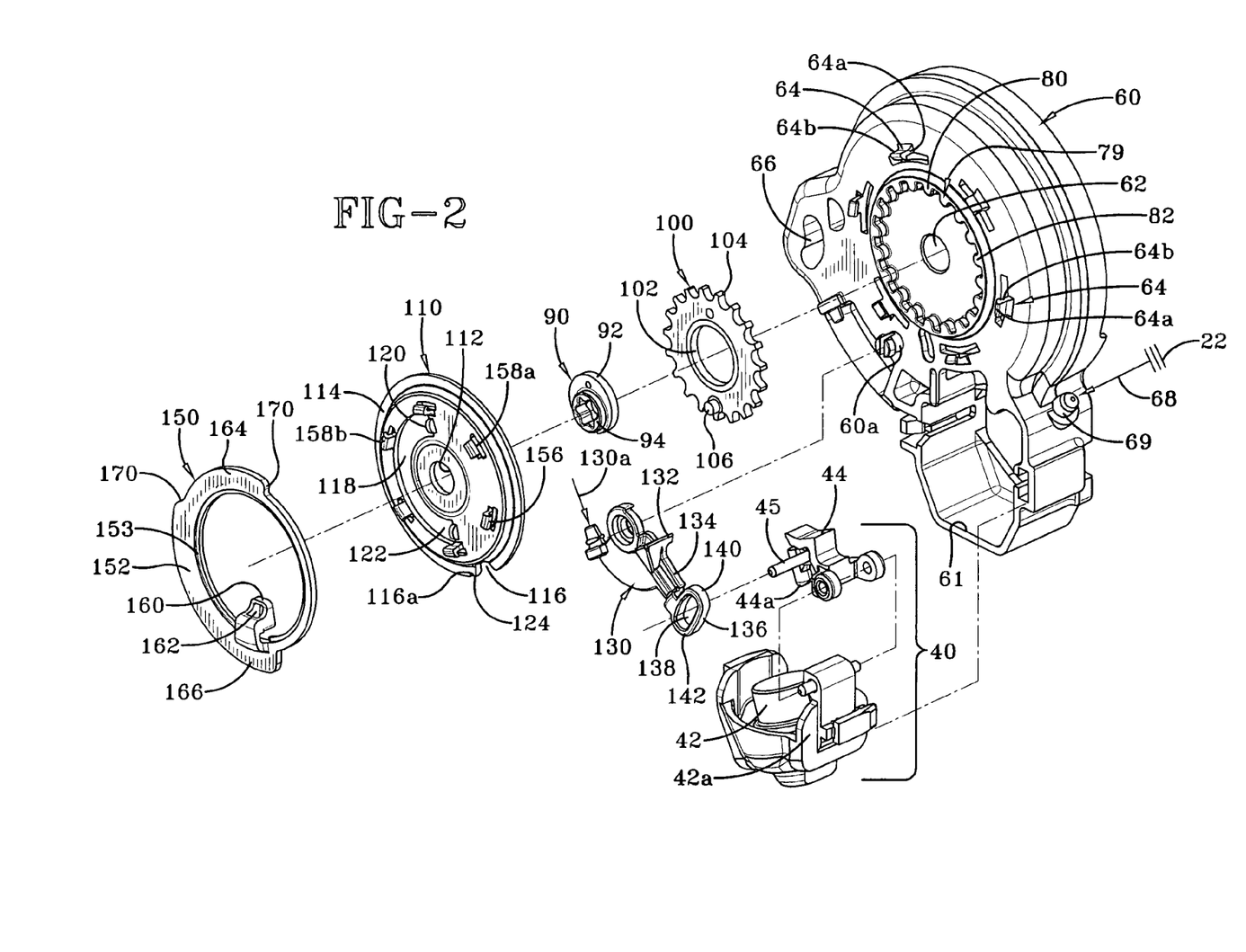
FIG. 2 is an assembly view showing the major features of an ELR and ALR locking mechanism incorporating the present invention.

Reference is made to FIGS. 1 and 2, which diagrammatically illustrate seat belt retractor 20 incorporating the present invention. The retractor 20 includes a frame 22 that rotationally supports this spool 24 in a known manner. Seat belt webbing 28 is wound about the spool 24 and can be protracted from and rewound onto the spool. The retractor 20 includes a primary locking system 30, which comprises lock wheel 32 (also known in the art as a ratchet wheel) having a plurality of teeth 34 and a lock pawl 36 having one or more teeth 38. This lock pawl may also include a pin 39 that functions as a cam follower.

The present retractor 20 is a dual mode retractor having ELR and ALR modes of operation. When in the ELR mode of operation retractor 20 utilizes inertial locking mechanisms to initiate the lockup of the retractor that effects movement of lock pawl 36 into engagement with lock wheel 32. These inertial locking mechanisms are generally referred to as a vehicle locking mechanism 40 comprising a movable mass 42 and sensor pawl 44 (see FIG. 2). The sensor pawl includes an extending pin or projection 45. The sensor pawl is movable by a co-acting lever 130 into (and away from) ratchet wheel 46 (see FIG. 1) having teeth 48; the wheel 46 rotates with and can be part of the spool 24.

As is known in the art, movement of the inertial mass 42 in response to excessive levels of vehicle deceleration (or large displacement of the vehicle in roll or yaw, or rotation of the surface upon which the retractor is mounted such as a seat back) causes the mass to move, roll or tip and engage an adjacent surface 44a of pawl 44, thereby placing pawl 44 into engagement with the teeth of ratchet wheel 46. Rotation of the ratchet wheel 46 with the sensor pawl engaged causes rotation of an associated lock cup 60 (see FIG. 2; also shown in phantom line in FIG. 1) which initiates the locking up of the retractor. Lock cups such as 60 are spring biased, typically against the frame 22 or other stationary retractor member, such spring being shown by arrow 68, which react against a boss or projection 69 (on the frame).

As with many seat belt retractors, retractor 20 utilizes a lock cup 60 to support the inertial mass 42, which is supported by a basket 42a or other known support structure. The basket is received within a well 61 of the lock cup 60. The basket can be fixed or movable relative to well 61. As mentioned above, engagement of the sensor pawl 44 to the ratchet wheel 46 couples the lock cup 60 to the ratchet wheel 46 (or to the spool 24) causing the lock cup to rotate with the spool (at least for some limited number of degrees) in a known manner. The rotation of the lock cup moves the lock pawl 36 into engagement with the teeth of the lock wheel 32 thereby completing the initial phases of the locking of the seat belt retractor. For example, the lock cup 60 may include a cam 66 into which is received the cam follower 39 of the lock pawl 36. The rotation of the lock ring 60 rotates the lock pawl 36 about axis 36a (see FIG. 1) into engagement with the teeth of the lock wheel 32.

As is known in the art, if the seat belt retractor 20 includes an energy absorber mechanism such as a torsion bar, after the retractor 20 is initially locked up, the spool is permitted to rotate and the seat belt permitted to protract from the spool 24 in a controlled manner as the torsion bar twists. The retractor 20 may also include a web sensor (not shown), as known in the art, which initiates a locking up of the seat belt retractor in response to an excessive rate of extension of the web from the retractor. This web sensor is housed in the lock cup as shown in U.S. Pat. No. 5,904,371 and EP patent application EP0228729A1, which have been incorporated by reference. Activation of the web sensitive locking mechanism also couples the lock cup to the spool, thereby also causing engagement of the lock pawl and lock wheel.

Retractor 20 will remain in its ELR mode of operation during all times with the exception of when all of the seat belt webbing has been retracted upon the spool, that is, the stowed condition, or when in the ALR mode of operation, which occurs in conjunction with the seat belt webbing being placed about a child seat.

The ALR locking mechanism 80 of the present invention utilizes a number of components known in the art. These known components include a ring gear 79, a center or eccentric gear 90, a movable or wobble gear 100 and a cam disk 110, shown both in FIGS. 2 and 3. The ring gear 80 has a plurality of teeth 82 and is, in the preferred embodiment of the invention, integrally formed on a surface of the lock cup 60. The center (eccentric) gear 90 is secured to and rotatable with spool 24. The spool 24 includes a stub axle or projection 27 (see FIGS. 1 and 3) that extends through opening 62 in the lock cup and is received within a bore on a rear surface of the center gear, thereby permitting the center gear 90 to move with the spool. The center gear 90 includes an eccentric outer surface 92 received within an opening 102 of the movable (wobble) gear 100 and a raised surface 94 that is concentric with opening 62 and received within an opening 112 of a cam disk 110.

Figure 3:
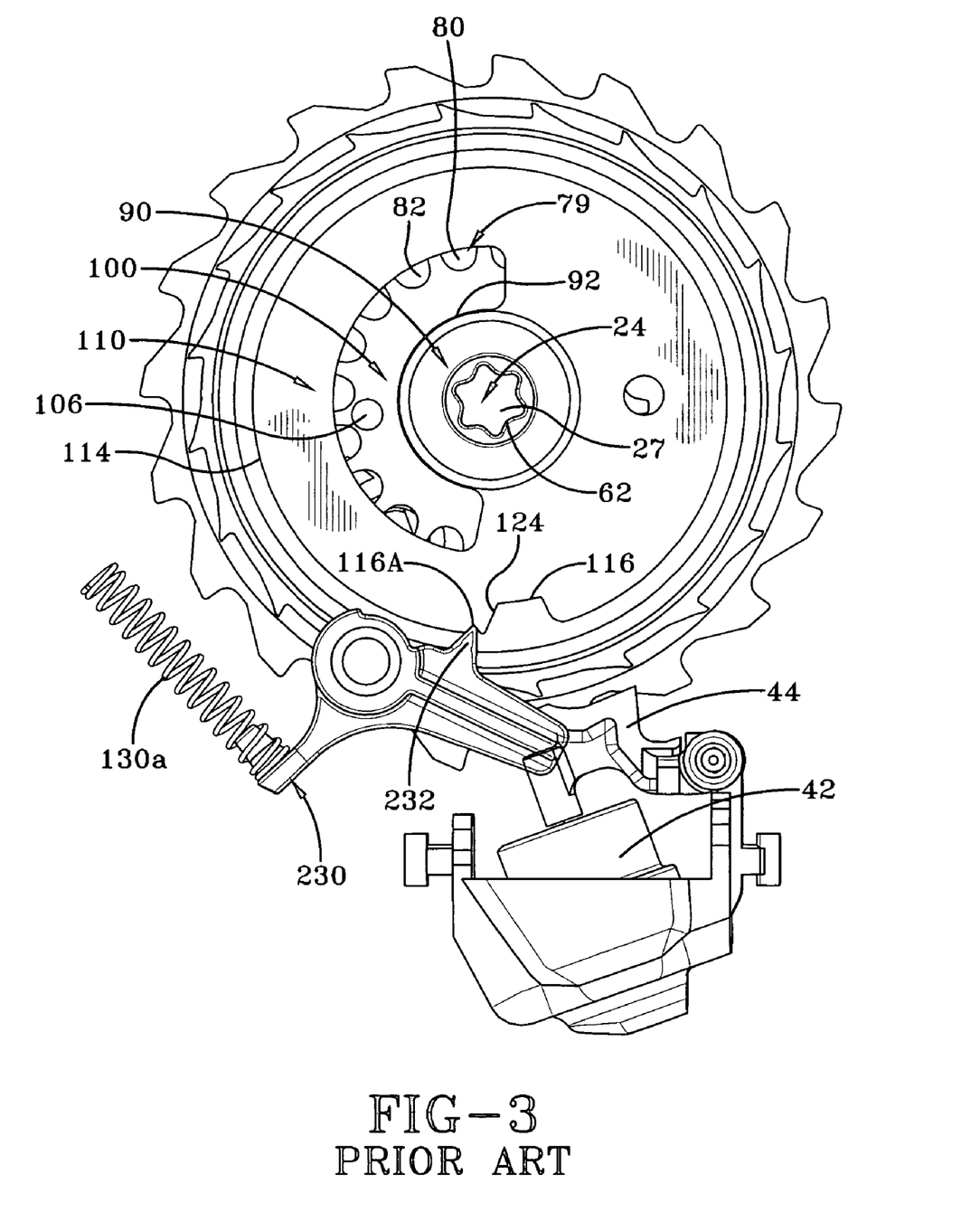
FIG. 3 shows locking mechanisms used by a prior art retractor with the seat belt webbing stowed on the spool.

The movable (wobble) gear 100 has a centrally located opening 102 and a plurality of teeth 104 engageable with the teeth 82 of the ring gear 80. As the center gear 90 rotates with the spool, the movable gear rotates and orbits about the ring gear 80. The movable gear 100 further includes an upstanding pin or projection 106.

The cam disk 110 has a concentric outer surface forming a cam surface 114; the cam surface includes at least one major indentation 116 (and an optional minor indentation 116a having a small depth). The cam disk 110 further includes an arcuate slot 118 into which the projection 106 of the movable gear 100 is received. As will be seen from the description below, the retractor will enter into its ALR mode of operation when a lever is permitted to fully enter into the indentation 116.

Prior art ALR mechanisms (see FIGS. 3 and 4) also include a spring-loaded lever 230 (see element 102 of U.S. Pat. No. 5,904,371) which functions as a cam follower 232 and also is used to activate an ALR pawl 234 (see pawl 80 of U.S. Pat. No. 5,904,371) to initiate the ALR mode of operation. The present invention also includes a spring-loaded lever referred to by numeral 130, which incorporates the above functions and also incorporates new functionality, as mentioned above, compared to the prior art. Lever 130 includes a known type of a projection 132, which functions as a cam follower. As will be seen, the cam follower 132 is biased against the cam surface 114 by a bias spring 130a (occasionally shown as an arrow).

Figure 4:
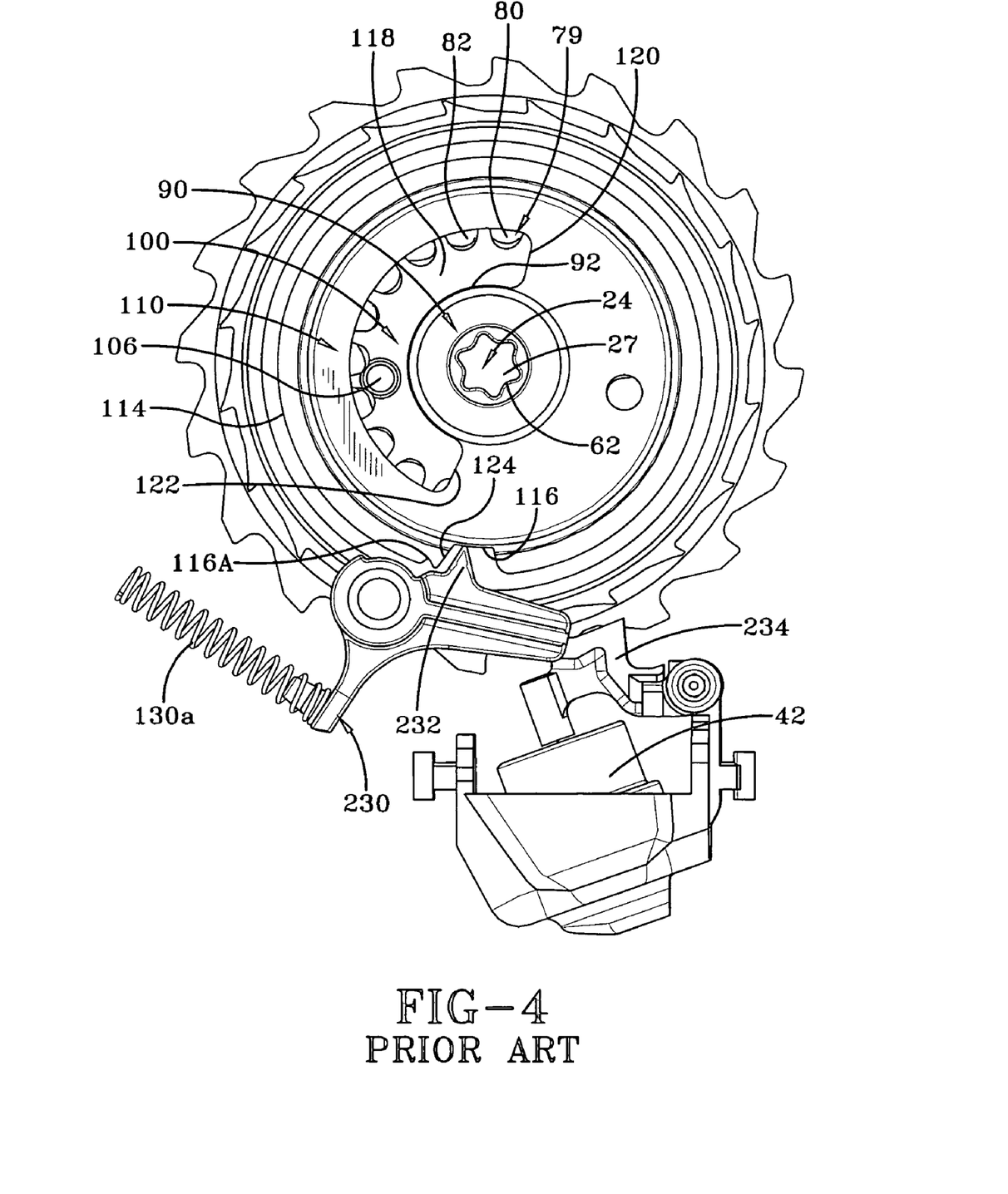
FIG. 4 shows locking mechanisms used by a prior art retractor with the seat belt webbing fully extended.

As mentioned earlier, the prior art ALR mechanism is activated upon the extension of virtually all of the seat belt from the spool 24. FIGS. 3 and 4 are illustrative of the operation of a prior art retractor and used for the purpose of illustration of some of the components of retractor 20. In the prior art ALR mechanism with all of the seat belt webbing rewound about the spool, the various components of the ALR mechanism will achieve a positional orientation as generally shown in FIG. 3. The cam follower 232 will position itself in the minor indentation 116a, which prevents premature movement of the cam disk 110. As the webbing is pulled from the spool, the spool rotates thereby causing the center gear 90 to rotate, which in turn moves movable gear 100, which in turn causes the projection 106 to rotate and orbit about the ring gear 80, as well as causing the projection 106 to move within slot 118 of the cam disk 110. As more and more seat belt webbing 28 is protracted from the spool, the projection 106 will be moved a sufficient distance to contact end 120 (see FIG. 4) of slot 118, thereby causing the cam disk 110 to rotate with the moving gear 100.

The gear mechanism is configured such that when virtually all of the webbing has been removed from the spool the cam disk 110 will present the slot 116 to the cam follower 232 (in the prior art), which causes the cam follower to be pushed into the slot 116 (see FIG. 4). This action does not happen in the present invention because of the invention of a second cam disk 150. Thereafter the lever 230 lifts the ALR pawl 234 into engagement with the teeth of the ratchet wheel 46 to initiate the ALR mode of operation (which, as can be appreciated, is initiated upon full or substantially full extraction of the seat belt). As mentioned, the prior art retractor will remain in this mode of operation until the webbing 24 is fully retracted. In the prior art ALR mechanism, as the webbing 24 is retracted the center gear moves oppositely causing the movable gear 90 and the projection 106 to move opposite to its prior motion. As the webbing is retracted, the projection 106 engages the opposite end 122 of slot 118, pushing the cam disk oppositely (counter-clockwise in FIG. 3). Such motion urges the cam follower 132 to move up a sloped surface 124 of slot 116 and become repositioned on the outer surface of the cam surface 114. This motion disengages the lever from the ALR pawl and ends the ALR mode of operation.

Figure 5:
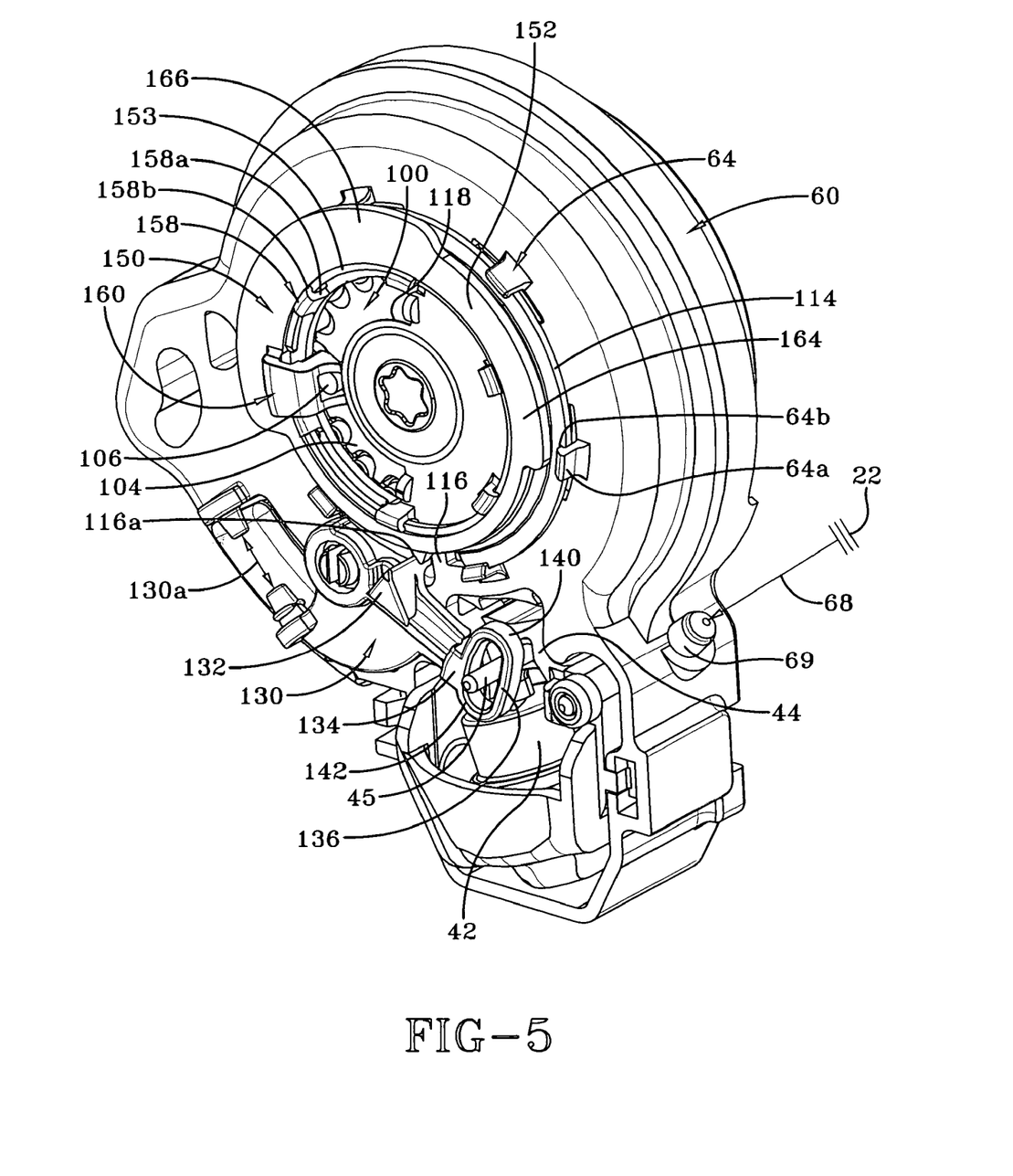
FIG. 5 is an isometric view of a lock cup.

Returning to the present invention, reference is again made to FIGS. 2 and 5, more particularly, the lock cup 60 includes a plurality of resilient inwardly directly flexible tabs 64 uniformly positioned about the ring gear 80 and concentric with opening 62 of the lock cup 60. The cam surface 114 is received within these tabs 64, which position the cam disk 110 concentric with the opening 62 (as well as the axis of rotation of the spool 24). Each tab 64 has an upraised wall portion 64a as well as an inwardly extending wall portion. The cam surface 114 rides against an inner wall of the upraised wall portion 64a while the inwardly directed wall portion 64b prevents the outer edge of the cam disk from moving away from the lock cup and ring gear.

As mentioned, the ALR mechanism of the present invention further includes a second cam disk 150 that assists in controlling the start of the ALR mode of operation to begin upon rewind of the spool after full extension of the webbing. The second cam disk, in concert with lever 130, also provides a controlled biasing of the sensor pawl 44 to provide a stabilizing force upon the sensor mass 42 at or near the complete retraction of the seat belt upon the spool to eliminate a source of vibration and noise. The cam disk 150 also permits the lever to achieve a mid-position to enable ELR mode of operation.

The second cam disk 150 includes a circular annular shaped wall 152 having a thin internal rim 153; the rim 153 is rotationally supported by the first cam disk 110. More particularly, the first cam disk 110 includes a plurality of inwardly directed tabs 156 similar in construction to the tabs 64. Tabs 156 include a first wall portion 158a extending away from the surface of the cam disk 110 and an outwardly directed portion 158b. An inner surface of portion 158a radially stabilizes the annular wall 152 while portion 158b holds rim 153, and hence, the second cam disk 150. The second cam disk 150 further includes an inwardly directed socket 160 having an opening 162 therein to loosely receive the projection 106 of the moving gear 100. The second cam disk also includes a first lobe or cam surface 164 positioned generally opposite the socket 160 and a second lobe or cam surface 166.

As the seat belt webbing is extended from the spool (from a fully stowed condition to a fully extended condition), the projection 106 of the wobble gear 100 generally orbits in a circle centered upon an axis collinear with the axis of the spool while simultaneously rotating or oscillating, at a higher frequency, about the circle, such movement constrained to be within the slot 118. The slot 118 affords the locking mechanism a degree of lost motion, that is when the projection 106 is not pushing on the ends of the slot 118, the first cam disk 110 will not move. The projection 106 directly moves the first cam disk in a clockwise manner in relation to FIG. 6 (during web extraction) and in a counter-clockwise manner (during web retraction). Additionally, as the projection or pin 106 moves as described, it also rotates within the opening 162 of socket 160 of the second cam disk 150, and carries the second cam disk 150 with the pin 106. As can be appreciated, second cam disk 150 will rotate clockwise and counterclockwise generally following the rotation of the wobble gear 100.

Figure 6:
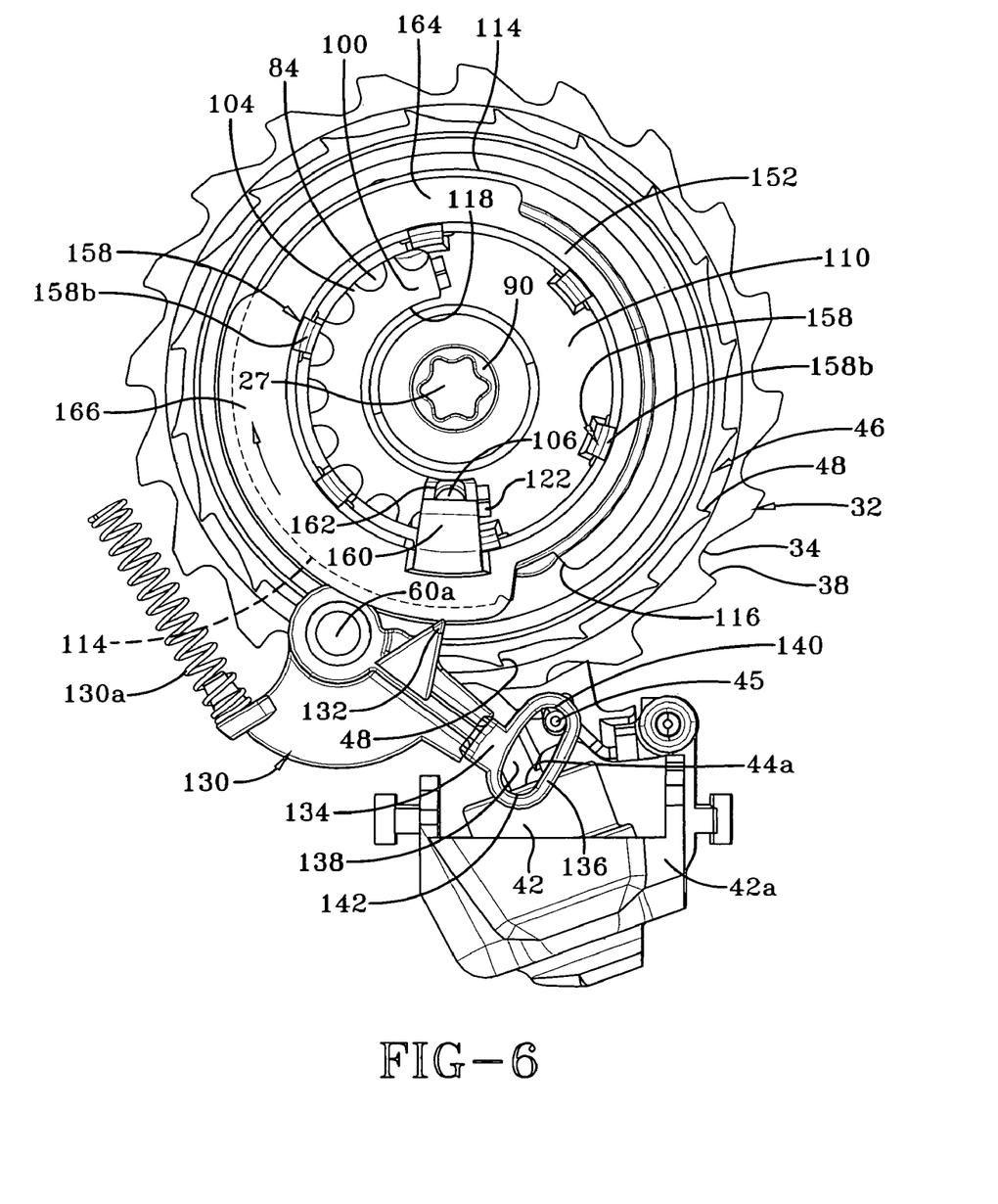
FIG. 6 shows the position achieved by the locking components when the seat belt has been fully rewound on the retractor spool to a stowed position; in this position the ELR locking mechanism is blocked out from use.

FIG. 6 shows the position of the various disks with the seat belt stowed on the spool. In this position, cam surface 166 urges the cam follower 132 away from cam surface 114 of cam disk 110. Cam surface 166 moves the cam follower 132 a greater distance away from the center of the spool.

Figure 6A:
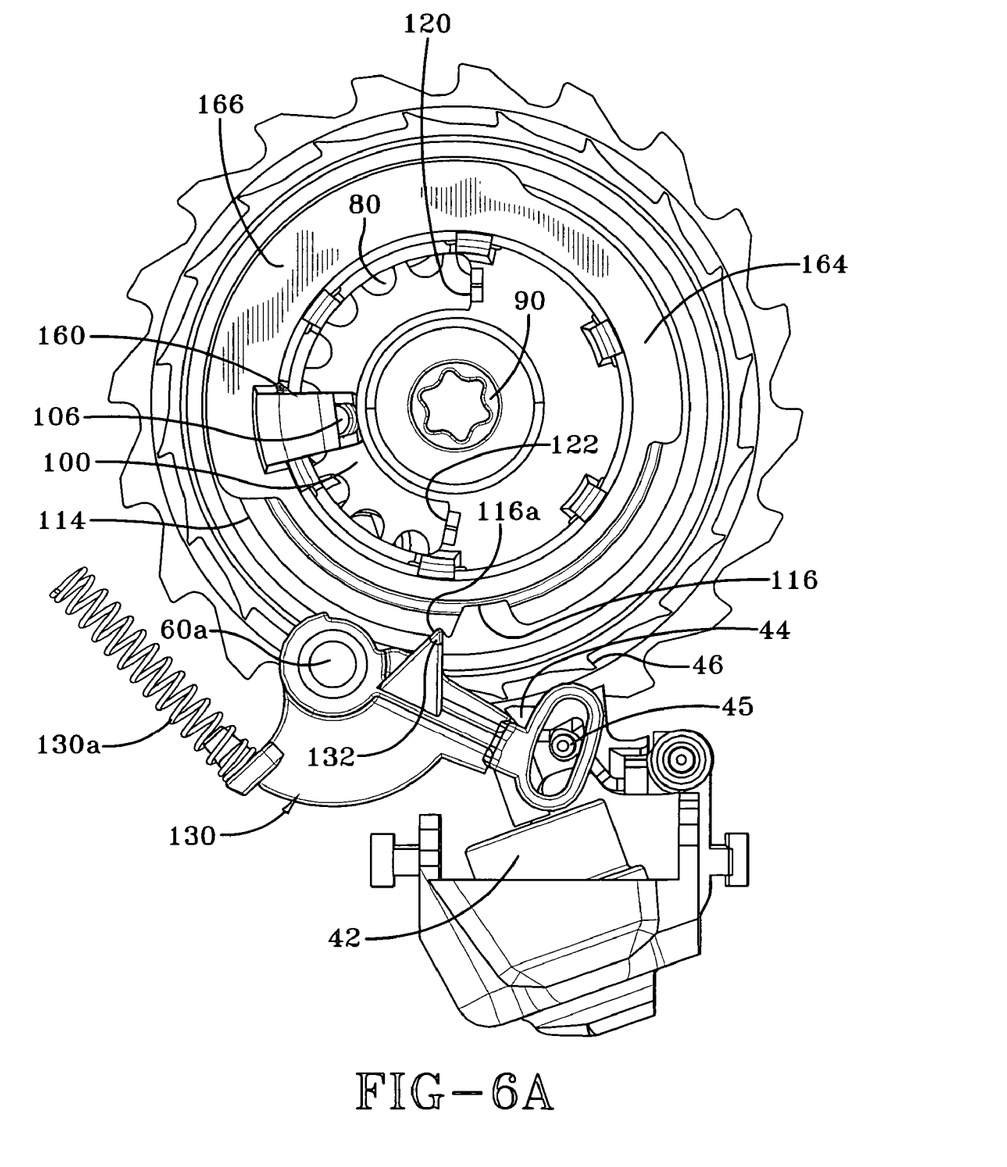
FIG. 6a shows the position achieved by the locking components when the seat belt has been pulled out a determinable amount in which the ELR mode of operation is active, however, the ALR mode is not available.

As the seat belt webbing is extended from the retractor, the spool will rotate in a clockwise direction (in relation to FIG. 6); the various components of the gearing mechanisms will similarly rotate. As the webbing is extracted, the wobble gear 100 (via projection 106 and socket 160) moves the second cam disk 150 in a clockwise manner (see arrow on the second cam disk). The first cam disk will generally remain in its initial position as the projection (pin) 106 is moved away from end 122 of slot 118 (into a free zone). After the seat belt has been slightly extended, the second cam disk will be moved (by projection 106) sufficiently clockwise to permit the cam follower 132 to fall onto cam surface 114 of the first cam disk 110. In this mode of operation, the cam follower 132 moves inwardly to cam surface 114, which moves the end 140 of lever 130 away from the pin 45 of the sensor pawl 44. This action permits the retractor to enter into its ELR mode of operation and is shown in FIG. 6a in which the sensor mass and the sensor pawl are not restricted from moving.

As mentioned above and shown in FIG. 5, the lever 130 is rotationally mounted to the lock cup 60. However, the lock cup is not shown in FIGS. 6, 6a, 7 and 8. Only a pin 60a (which is part of the lock cup and which rotationally supports the lever 130) is shown.

Figure 7:
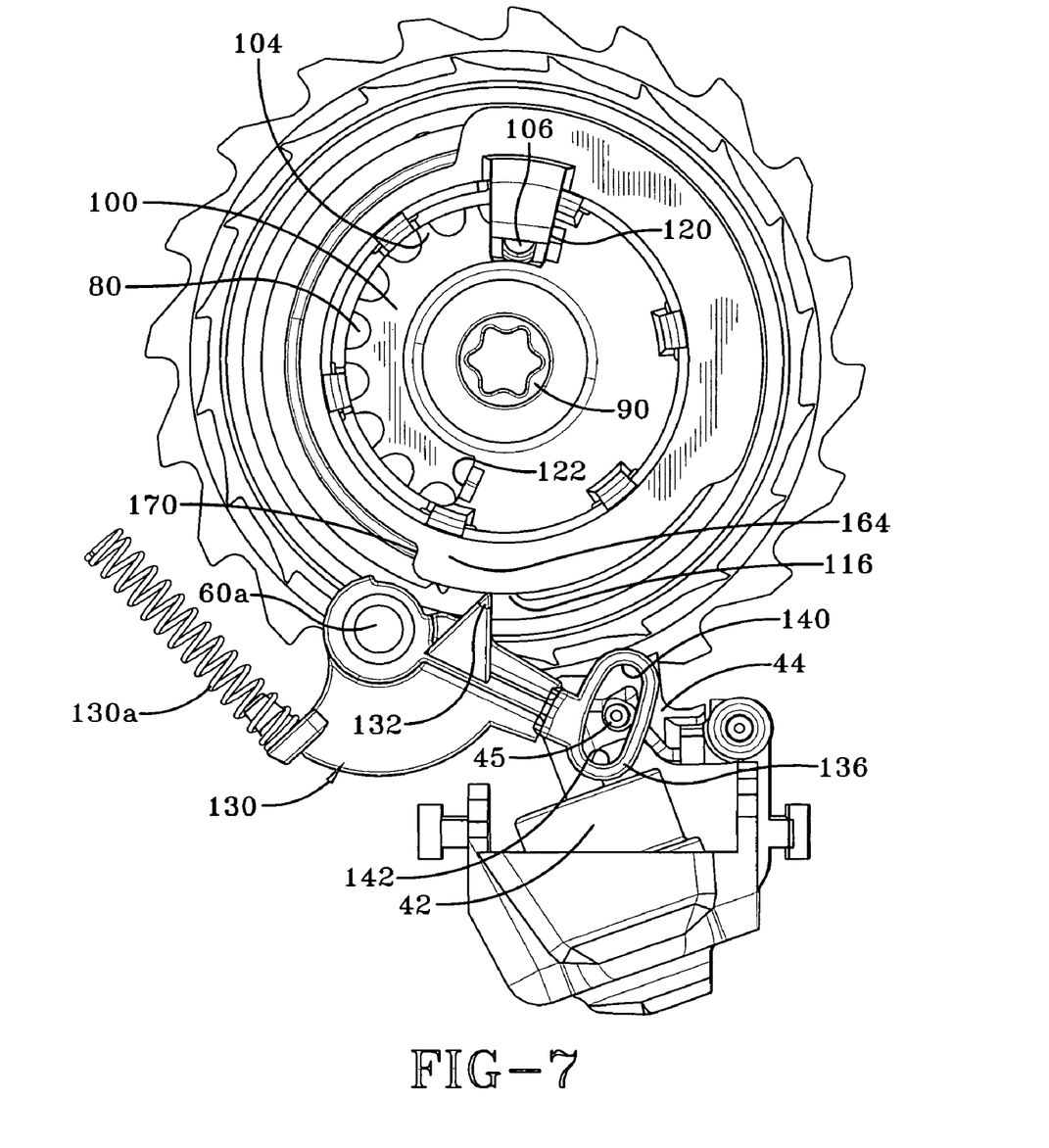
FIG. 7 shows the position achieved by the locking components with virtually all of the seat belt pulled from the spool, just prior to activation of the ALR mode of operation.

The second cam disk 150 is configured to be located above the slot 116 (of cam disk 110) generally just before all of the webbing 28 has been extracted as shown in FIG. 7. As can be appreciated, the placement of the lobe or surface 164 above the slot 116 prevents the cam follower 132 of lever 130 from entering into the slot 116, thereby preventing the retractor from entering into its ALR mode of operation on full extraction of the webbing 28, as taught by the prior art. The dimension of the radial distance of surface 164 is not critical, it can be the same as the radial distance of surface 114, slightly smaller or greater as it acts as a blocking surface. Upon release of the webbing 28 or the reduction of the force holding the webbing in its extended condition, the webbing will begin to be rewound upon the spool by operation of the rewind spring 29 (see FIG. 1). This change of direction of the spool 24 causes the center (eccentric) gear 90 to rotate oppositely causing the moving (wobble) gear 100 to move oppositely as well (counterclockwise in FIG. 7).

This action causes movement of the projection (pin) 106 away from end 120 of slot 118, which moves the second cam disk 150 in a counterclockwise direction opposite to its motion when the seat belt was being extended. Upon a determinable amount of rotation of disk 150, the cam follower 132 is permitted to slide upon edge 170 of lobe 166, and enter into groove 116 (see FIG. 8), as this action permits the lever 130 to move inwardly. Inward movement of lever 130 raises the pin 45 of the sensor pawl 44 and moves sensor pawl 44 into engagement with the teeth of ratchet gear 46 to now begin the ALR mode of operation as the spool rotates in the direction of seat belt retraction.

As the spool rotates in a rewind direction the projection 106 continues to move the second cam disk 150 in synchronism with the movement of the projection 106. After a determinable amount of webbing has been rewound onto the spool, the projection 106 will eventually engage end 122 of slot 118, thereby reengaging cam disk 110. Subsequently, the first cam disk 110 is pushed (rotated) back to its initial position corresponding to a fully rewound spool shown in FIG. 6, completing the cycle and positioning lobe 166 under the cam follower 132, thereby biasing the lever 130 downwardly or outwardly (in FIG. 6) away from surface 114 or in a counterclockwise manner (as viewed in relation to FIG. 2).

Figure 8:
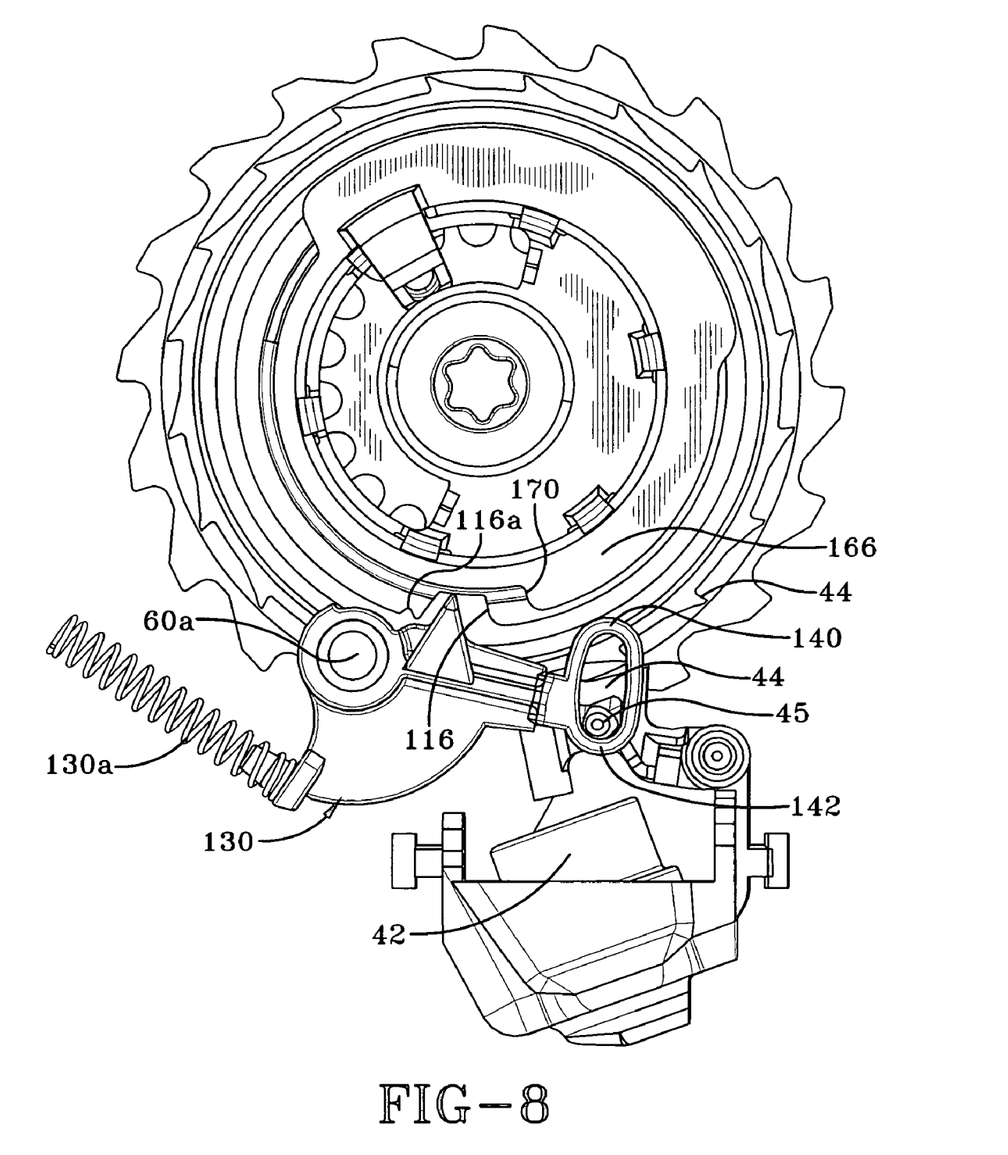
FIG. 8 shows the position of various locking components at the beginning of ALR operation.

As described more fully below, when the lever 130 is pushed outwardly upon engagement with the lobe 166 of the second cam disk 150, the pin 45 (of the sensor pawl 44) is biased downwardly by a surface to hold the sensor pawl 44 upon the top of the inertial mass 42. The above-mentioned lever 130 includes a distal end 134 having a ring 136 defining an opening 138. The pin 45 of the sensor pawl 44 is received within opening 138 of the ring 136. One end 140 of the ring forms a first engagement surface and an opposite end 142 of the ring forms a second engagement surface. When the lever 130 moves into groove 116 the second engagement surface 142 lifts the pin 45 and hence the sensor pawl 44 into engagement with the ratchet wheel 46 (as shown in FIG. 8) initiating the ALR mode of engagement. On return of the webbing to the spool as shown in FIG. 6, the engagement surface 140 urges the pin 45, and hence the sensor pawl 44, downwardly onto the sensor mass 44, preventing the locking mechanism from becoming activated in the stowed position, regardless of the physical orientation of the retractor. As can be appreciated, the lever 130 assists in initiating the ALR mode of operating by moving the sensor pawl and also acts to block the ELR mode of operation by preventing movement of the sensor pawl.

Many changes and modifications in the above-described embodiment of the invention can, of course, be carried out without departing from the scope thereof. Accordingly, that scope is intended to be limited only by the scope of the appended claims.

The invention claimed is:

1. A seat belt retractor (20) having ELR and ALR modes of operation,
the retractor comprising a sensor pawl (44) movable between a release and a locked position with one or more teeth of a ratchet wheel (46), the ratchet wheel rotatable in correspondence with a spool of the retractor; the sensor pawl forming part of both ELR and ALR locking mechanisms;
the retractor also including first and second cam disks configured to rotate about an axis of rotation in correspondence with the rotation of the spool; the axis of rotation for each of the first and second cam disks and that of the spool being colinear; a periphery of each cam disk configured to provide a respective first and second cam surface of varying radial dimension; the second cam surface of the second disk overlaid relative to the first cam disk and configured to selectively obscure portions of the first cam disk as a function of the rotation of the second cam disk, and to selectively permit access to various portions of the first cam surface as a function of the rotation of the second cam disk by presenting a depression in the second cam surface to a cam follower and to prevent access to the first cam surface by presenting another profile in the second cam surface to the cam follower,
a spring biased first lever (130) which includes the cam follower (132), the cam follower is biased into engagement with the first cam surface during instances when the cam follower is not engaged with the second cam surface, the first lever as well as cam follower, is movable to a respective first position upon interaction of the cam follower with the first cam surface and when in such first position urges the sensor pawl (44) toward engagement with the ratchet wheel (46), the first lever is movable to a second position upon engagement with the second cam surface to urge the sensor pawl away from the ratchet wheel teeth thereby preventing the retractor from entering into its ALR mode of operation, the lever, when in its second position, biases the sensor pawl into engagement with a cooperating inertial mass (42) that is part of a vehicle sensitive locking mechanism of the seat belt retractor, this bias operative on the sensor pawl is effective to limit the motion of the inertial mass to lessen or eliminate vibrational movement of the inertial mass relative to the sensor pawl and lessen movement of the inertial mass relative to a support basket or support structure (44a) that supports the inertial mass thereby lessening acoustic and vibrational noise created by the movement and rattling of the sensor pawl or inertial mass.

2. The retractor as defined in claim 1 wherein the second cam disk (150) includes a socket to loosely receive a projection (106), the projection part of a geared mechanism rotatable in correspondence with the rotation of the spool, the projection urging the second cam disk to rotate in a clockwise or counterclockwise direction as the spool and geared mechanism rotate in one or another direction;
wherein the second cam surface includes a radially extending first cam profile (164) generally opposite the location of the socket (160) and an outwardly directed second cam profile (166) positioned therebetween.

3. The retractor as defined in claim 1, wherein each of the first and second cam disk do not have gear teeth and wherein the second cam disk is rotationally supported by and slidable upon the first cam disk.

4. The retractor (20) as defined in claim 1 wherein the first lever (130) is pivotable about a pivot, such pivot being on one side of the cam follower, the first lever further having an end or surface (140) positioned on another side of the cam follower (132), the sensor pawl (44) further including a pin (45), wherein in a stowed mode of operation with a substantial amount of webbing wound about the spool, the end or surface (140) urges the sensor pawl pin (45) and sensor pawl (44) to rotate away from engagement with the ratchet wheel (46), wherein the sensor pawl (44) is configured to apply pressure onto a movable mass (42) prohibiting entry of the retractor into an ELR mode of operation.

5. A seat belt retractor having at least three modes of operation: an ELR mode, an ALR mode and a stowed mode, and an ELR mechanism and an ALR mechanism; the ELR mechanism comprising:
a vehicle locking mechanism (40) comprising:
a movable mass (42) and
a sensor pawl (44) movable by the movable mass (42) in response to excessive levels of vehicle deceleration into engagement with a ratchet wheel (46) movable with a spool (24) of the retractor;
the sensor pawl interacting with a co-acting lever (130), having a cam follower (132), into and out of contact with the ratchet wheel (46);
the retractor configured that upon engagement of the sensor pawl with the ratchet wheel, a lock cup moves causing a lock pawl to engage a lock wheel, thereby preventing further unwinding of the spool and withdrawal of belt; and
the movable mass supported by the lock cup (60)
the ALR mechanism comprising:
a ring gear (79) formed on the lock cup (60);
an eccentric gear (90), having an outer surface (92) rotatable with the spool and received within a wobble gear (100), the wobble gear rotatingly engaged with teeth (82) of the ring gear (79);
the wobble gear including a projection (106) movable therewith, the wobble gear and the projection configured to rotate and orbit relative to the ring gear (79) in correspondence with the spool or in correspondence with a shaft of the retractor;
a first cam disk (110) having:
an outer cam surface (114), concentric to an axis, the cam surface (114) including a major first indentation (116) engagable with the cam follower and rotatably held to the lock cup (60) by a plurality of flexible tabs (64);
an arcuate slot (118) into which the projection (106) is movably received, the slot (118) having ends (120) and (122) for periodic engagement with the projection, the cam disk rotatable with the projection in a first direction upon engagement of the projection with end (120) and rotatable in an opposite second direction upon engagement of the projection with end (122); wherein the lever (130) biased towards the cam surface by a first bias spring (130a);
a second cam disk (150) rotatable relative to the lock cup and the ring gear, as well as to the first cam disk (110) and the wobble gear (100), the second cam disk (150) selectively rotatable to selectively prohibit the cam follower (132) from entering into the first indentation (116) and any other indentations thereon;

the second cam disk (150) including a socket to loosely receive the projection (106), the second cam disk (150) rotatable with projection (106);

the second cam disk further including an outwardly extending first cam surface (164) generally opposite the location of the socket (160) and an outwardly directed second cam surface (166) positioned therebetween;

wherein the wobble gear (100) is configured to move about the ring gear (79) in a belt rewind direction as a belt, received about the spool, is extended from a fully stowed condition to a fully extended condition, the first cam disk (110) maintained in a non-rotatable state until the projection (106) pushes upon either slot end (120) or (122);

the second cam disk (150) being rotatable with movement of the projection (106);

the components configured so that in the stowed mode, with substantially all the belt on the spool (24), the second cam surface (166) is positioned over the first indentation (116) urging the cam follower (132) away from the cam surface (114) of cam disk (110).

6. A first cam disk according to claim 5 wherein the first cam disk includes a plurality of tabs (156) to rotationally support the second cam disk.

7. A socket as defined in claim 5 wherein the socket is oversized relative to the projection (106).

8. The retractor as defined in claim 7 wherein the socket is positioned adjacent an interior edge of the second cam disk.

9. The retractor as defined in claim 5 wherein the second cam disk includes a transition surface which urges the cam follower radially outward to reside upon the second cam surface (166) upon movement of the second cam disk.

10. The retractor (20) as defined in claim 5 wherein the lever (130) is pivotable, such pivot being on one side of the cam follower, the lever further having an end or surface (140) positioned on another side of the cam follower (132), the sensor pawl (44) further including a pin (45), wherein in the stowed mode, the end or surface (140) urges the sensor pawl pin (45) and sensor pawl (44) to rotate away from engagement with the ratchet wheel (46) and causing the sensor pawl (44) to apply pressure onto the movable mass (42), prohibiting entry of the retractor into its ELR mode of operation.

11. The retractor as defined in claim 10 wherein the retractor is configured such that further extension of the belt from the stowed condition causes rotation of the wobble gear in a belt-winding direction urging the second cam disk in the same direction relative to the first cam disk (110) exposing the first indentation (116) and away from the cam follower (132), thereby permitting the cam follower (132) to engage the cam surface (114) of the first cam disk (110), such engagement separating the end (140) of lever (130) from pin (45) of sensor pawl (44), freeing the movable mass (42) and sensor pawl (44).

12. The retractor as defined in claim 5 wherein the second cam disk (150) is configured to be moved by the projection and positioned in front of the first indentation (116) generally immediately prior to all of the belt being extracted from the retractor, thereby preventing the cam follower from entering into the first indentation to initiate the ALR mode of operation.

13. The retractor as defined in claim 12 wherein immediately prior to all of the belt being extracted from the retractor, the second cam surface of the second cam disk is positioned in blocking relation to the first indentation.

14. The retractor as defined in claim 13 wherein the first cam surface of the second cam disk is at a radius greater than the radius of the second cam surface of the second cam disk.

15. The retractor as defined in claim 13 whereupon movement of the spool in a belt-winding direction moves the second cam disk in a belt-winding direction to uncover the first indentation, enabling the lever (130) to enter into the first indentation, urging the sensor pawl pin (45) into engagement with the ratchet wheel to initiate the ALR mode of operation, the retractor configured to stay in the ALR mode of operation until the belt has been rewound upon the spool to initiate the stowed mode of operation.

16. A seat belt retractor having at least three modes of operation: an ELR mode, an ALR mode and a stowed mode, and an ELR mechanism and an ALR mechanism; the ELR mechanism comprising:

a vehicle locking mechanism (40) comprising:

a movable mass (42) and a sensor pawl (44) movable upon movement of the movable mass (42) in response to excessive levels of vehicle acceleration or deceleration into engagement with a ratchet wheel (46) movable with a spool (24) of the retractor;

the sensor pawl interacting with a co-acting lever (130), an engagement portion of the lever retracting movement of the sensor pawl to the ratchet wheel or permitting such movement, the lever also including a cam follower;

the retractor configured that upon engagement of the sensor pawl a lock wheel is engaged, thereby preventing further unwinding of the spool and withdrawal of the belt; and the vehicle locking mechanism further including the movable mass;

the ALR mechanism comprising:

a gear set which rotates with the spool;

a first gear of the gear set including a projection (106) movable therewith, the first gear and the projection configured to rotate a first and second cam disk generally in correspondence with rotation of the spool;

the first cam disk (110) having:

an outer cam surface (114), concentric to an axis, the outer cam surface (114) including a major first indentation (116) engagable with the cam follower and rotatably held to the lock cup (60) by a plurality of flexible tabs (64);

an arcuate slot (118) into which the projection (106) is movably received, the slot (118) having ends (120) and (122) for periodic engagement with the projection, the cam disk rotatable with the projection in a first direction upon engagement of the projection with end (120) and rotatable in an opposite second direction upon engagement of the projection with end (122); wherein the lever (130) is biased towards the cam surface by a first bias spring (130a);

a second cam disk (150) rotatable relative to the lock cup as well as to the first cam disk (110) and the first gear (100), the second cam disk (150) selectively rotatable to selectively prohibit the cam follower (132) from entering into the first indentation (116) and any other indentations thereon;

the second cam disk (150) including a socket to loosely receive the projection (106), the second cam disk (150) rotatable with projection (106);

the second cam disk further including an outwardly extending cam surface (164) generally opposite the location of the socket (160) and an outwardly directed second cam surface (166) positioned therebetween;

wherein the first gear is configured to move about a ring gear (79) in a belt rewind direction as a belt, received about the spool, is extended from a fully stowed condition to a fully extended condition, the first cam disk (110) maintained in a non-rotatable state until the projection (106) pushes upon either slot end (120) or (122);

the components configured so that in the stowed mode, with substantially all the belt on the spool (24), the second cam surface (166) is positioned over the first indentation (116) urging the cam follower (132) away from the cam surface (114) of cam disk (110).

17. The socket as defined in claim 16 wherein the socket is oversized relative to the projection (106).

18. The retractor (20) as defined in claim 16 wherein the lever (130) is pivotable, such pivot being on one side of the cam follower, wherein the engagement portion of the lever including an end or surface (140) is positioned on another side of the cam follower (132), the sensor pawl (44) further including a pin (45), wherein in the stowed mode, the end or surface (140) urges the sensor pawl pin (45) and sensor pawl (44) to rotate away from engagement with the ratchet wheel (46) and causing the sensor pawl (44) to apply pressure onto the movable mass (42), prohibiting entry of the retractor into its ELR mode of operation.

* * * * *